United States Patent
Shubs, Jr. et al.

(10) Patent No.: US 10,081,377 B2
(45) Date of Patent: Sep. 25, 2018

(54) GEO-FENCE CONTROL OF A NOTIFICATION SYSTEM

(71) Applicant: Progress Rail Locomotive Inc., LaGrange, IL (US)

(72) Inventors: Alexander Shubs, Jr., Chicago, IL (US); David M Roenspies, Elburn, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 132 days.

(21) Appl. No.: 14/954,122

(22) Filed: Nov. 30, 2015

(65) Prior Publication Data

US 2017/0151967 A1    Jun. 1, 2017

(51) Int. Cl.
| | |
|---|---|
| *B61L 25/02* | (2006.01) |
| *B61L 27/00* | (2006.01) |
| *H04W 4/021* | (2018.01) |
| *B61L 15/00* | (2006.01) |

(52) U.S. Cl.
CPC .......... *B61L 25/02* (2013.01); *B61L 15/0081* (2013.01); *B61L 25/025* (2013.01); *B61L 27/0077* (2013.01); *B61L 27/0094* (2013.01); *H04W 4/021* (2013.01); *B61L 2205/04* (2013.01)

(58) Field of Classification Search
CPC ...... B61L 1/00; B61L 1/02; B61L 1/14; B61L 13/00; B61L 13/002; B61L 13/04; B61L 25/00; B61L 25/02; B61L 25/04; B61L 25/08; B61L 27/00; B61L 27/0005; B61L 27/0011; B61L 27/0038; B61L 27/04
See application file for complete search history.

(56) References Cited

U.S. PATENT DOCUMENTS

| | | | |
|---|---|---|---|
| 7,484,663 B2 | 2/2009 | Olsen, III et al. | |
| 7,783,507 B2 | 8/2010 | Schick et al. | |
| 8,229,473 B1 | 7/2012 | De La Rue | |
| 8,334,773 B2 | 12/2012 | Cova et al. | |
| 8,456,302 B2 | 6/2013 | Stevens | |
| 8,532,842 B2 * | 9/2013 | Smith | B61L 3/006 246/167 R |
| 8,593,276 B2 | 11/2013 | Doyle | |
| 8,755,824 B1 | 6/2014 | Wang et al. | |
| 8,941,489 B2 | 1/2015 | Sheshadri et al. | |
| 8,942,743 B2 | 1/2015 | Pitt et al. | |
| 2006/0047419 A1 | 3/2006 | Diendorf et al. | |
| 2013/0324160 A1 | 12/2013 | Sabatellil et al. | |

(Continued)

FOREIGN PATENT DOCUMENTS

WO    2011116400    9/2011

*Primary Examiner* — Robert J McCarry, Jr.
(74) *Attorney, Agent, or Firm* — Miller, Matthias & Hull

(57) ABSTRACT

A notification system is presented for use within a mobile machine. The notification system may have a route upon which the mobile machine may travel. This may be a train traveling on a track. A geo-fence may also be part of the notification system. The geo-fence may enclose at least a portion of the route through with the mobile machine may travel. The notification system may also include a status notification. The status notification may relate to the operational health of the mobile machine or a subsystem of the mobile machine. The status notification may be generated by the notification system when the mobile machine enters the geo-fence and received by a user.

20 Claims, 5 Drawing Sheets

(56) References Cited

U.S. PATENT DOCUMENTS

2014/0194101 A1    7/2014   Mullen et al.
2015/0148061 A1    5/2015   Koukoumidis et al.
2015/0158513 A1    6/2015   Costa et al.

* cited by examiner

GEO-FENCE CONTROL OF A NOTIFICATION SYSTEM

TECHNICAL FIELD

The present disclosure generally relates to a notification system, and more particularly relates using a geo-fence control to report a train asset status notification from the notification system.

BACKGROUND

Traditional operation of a locomotive starts with a train engineer or a conductor. Sitting in a cab section of a locomotive, the engineer runs the operation of the train. The engineer will manually input commands into the control unit of the locomotive so that the train may speed up, slow down, or brake. Although this set up works well for short trips, longer trips can be exhausting and tedious for the engineer to be ever vigilant, or to perform tasks adjusting the locomotive systems over a long period of time.

Throughout the journey, the engineer is responsible for monitoring and maintaining operation of the train. During its journey the train may report to the engineer or others on board specific information regarding train operations. This information may include health and operation of the engines of the locomotive, health of the train braking system, current cargo associated with the train, fuel levels, as well as distance and expected travel time to the next stop.

Some of this information may be useful to the engineer or others aboard the train at a given time, and during other times that information may be irrelevant. For example, the current cargo supply of the train may be an important notification to the engineer when the train has entered or departed a predetermined stop location. However, during travel between locations, this information may be irrelevant in comparison to other concerns the engineer may have. During travel between locations, the engineer may be more concerned with the operational health of the train and train systems as opposed to the actual cargo transported by the train. Providing a notification system to the operator of a train would be beneficial if such a notification system would allow the operator to view and receive information pertinent during the multiple stages of the journey.

Previous efforts have been made to produce a notification system for a user dependent on a current location. As seen in U.S. Pat. No. 8,755,824, a notification may be presented to a user when the user enters a designated geo-fence area. The geo-fence area is a bounded geographical area determined by a series of geographical coordinates obtained by the global positioning system. In this situation, a user may enter a geo-fence area and receive "cluster" of multiple points of interest. Instead of multiple geo-fences of each point of interest within, this disclosed geo-fence system employs a general cluster boundary which when entered by a user would notify the user of all points of interest within the cluster boundary.

Although this situation may work for a new visitor in a foreign city, it is not applicable to the specific nature and important detail needed in the transportation of goods. Any type of geo-fence system used within the transportation industry must meet the specificity of controlling inventory as well as addressing the individual needs of each geo-fenced area. Therefore, it would be advantageous, to develop a notification system for the transportation of goods and services which would report the needed specificity of the transportation field when a vehicle enters a particular geo-fenced region, while removing unnecessary notifications not pertinent to the particular geo-fenced region.

SUMMARY OF THE DISCLOSURE

In one aspect of the disclosure, a notification system is disclosed for use on a vehicle. The notification system may have a route upon which the vehicle may travel. A geo-fence may also be part of the notification system. The geo-fence may enclose at least a portion of the route through with the vehicle may travel. The notification system may also include a status notification. The status notification may relate to the operational health of the vehicle or a subsystem of the vehicle. The status notification may be generated by the notification system when the vehicle enters the geo-fence and is received by a user.

In another aspect of the disclosure, a train is disclosed. The train may have a plurality of rail vehicles positioned along a track and attached to one another. A locomotive may be one of the plurality of rail vehicles. The locomotive may have an engine, a locomotive subsystem, a controller, and a signaling system. The controller may connect to each of the engine, the locomotive subsystem, a train subsystem, and the signaling system and have a notification system contained within the controller. The notification system may have a route upon which the train may travel. A geo-fence may also be part of the notification system. The geo-fence may enclose at least a portion of the route through with the train may travel. The notification system may also include a plurality of train asset status notifications. The plurality of train asset status notifications may relate to the engine, the locomotive subsystem, or the train subsystem of the train. The plurality of status notifications may be generated by the notification system when the train enters the geo-fence and is received by a user.

In yet another aspect of the disclosure, a method of reporting a train asset status notification to a user is disclosed. First, a train is provided having a notification system. Then, a geo-fence may be entered by the train having the notification system. Next, the notification system identifies and confirms that the train has entered the geo-fence. Then, the train asset status notification is produced based on a parameter of the geo-fence stored within the notification system. Finally, the train asset status notification is reported to the user.

These and other aspects and features of the present disclosure will be more readily understood when reading the following detailed description taken in conjunction with the accompanied drawings.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION

The present disclosure provides for a notification system 100 used in conjunction with a bounded area through which a train consist 120 may travel. While the following is seen with respect to train consists and locomotives, it is to be understood that the teaching of this disclosure are not so limited and may be applied to any mobile machine. Moreover, references to various elements described herein, are made collectively or individually when there may be more than one element of the same type. However, such reference are rendered to merely aid the reader's understanding of the present disclosure and to be considered as exemplary. Accordingly, it may be noted that any such reference to elements in the singular is also to be construed to relate to the plural and vice versa without limiting the scope of the disclosure to the exact number or type of such elements unless set forth explicitly in the presented claims.

Figure 1:
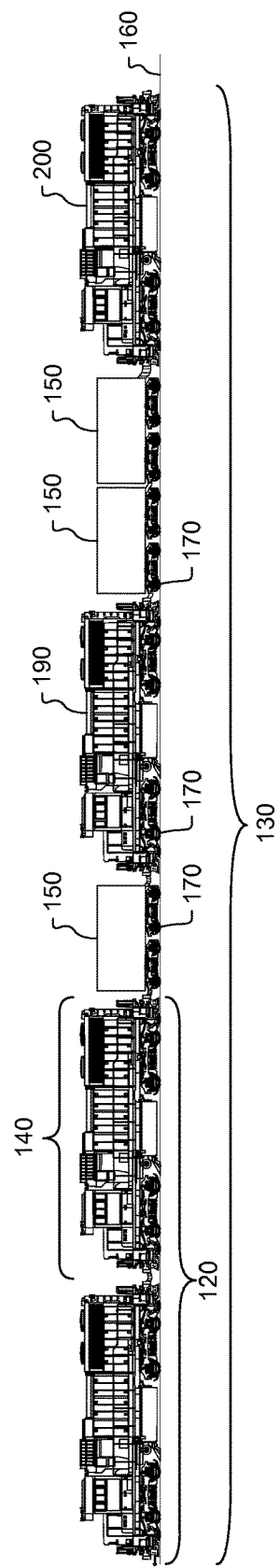
FIG. 1 is a side view of a train consist in accordance with one embodiment of the present disclosure.

Referring now to the drawings and with specific reference to FIG. 1, the train consist 120 consistent with an embodiment of the present disclosure is generally referred to by reference numeral 120. Although train consist 120 is illustrated as a rail transport assembly having a leading locomotive and a plurality of cargo cars there behind, the train consist 120 may be any type of mobile machine used to perform a driven operation involving physical movement associated with a particular industry, such as, without limitation, transportation, mining, construction, landscaping, forestry, agriculture, etc.

Non-limiting examples of such machines, for both commercial and industrial purposes, include but are not limited to trains, diesel-electric locomotives, diesel mechanical locomotives, mining vehicles, on-highway vehicles, earth-moving vehicles, loaders, excavators, dozers, motor graders, tractors, trucks, backhoes, agricultural equipment, material handling equipment and other types of vehicles that may operate in a tracked work environment. It is to be understood that the train consist 120 is shown primarily for illustrative purposes to assist in disclosing features of various embodiments, and that FIG. 1 does not depict all of the components of a train consist 120.

The train consist 120 as depicted in FIG. 1 illustrates a typical train 130 configuration. In a configuration such as this multiple locomotives 140 are connected together at the front of the train 130. The locomotive 140 may be coupled to at least one railcar 150. The locomotive 140, and corresponding train 130, may travel along a route 160, such as, one or more rails of a track. The locomotive 140 and railcars 150 may travel along the route 160 with the use of wheels 170. Multiple locomotives 140 connected together and in communication with one another to pull a train 130 are called a train consist 120. Additional locomotives such as a middle locomotive 190 and a rear locomotive 200 can be attached to the train 130 as well. Placed in between the locomotives 140, 190, and 200 of the train 130 are the railcars 150. The railcars 150 can be passenger cars or freight cars for carrying passengers, goods, or other loads.

Figure 2:
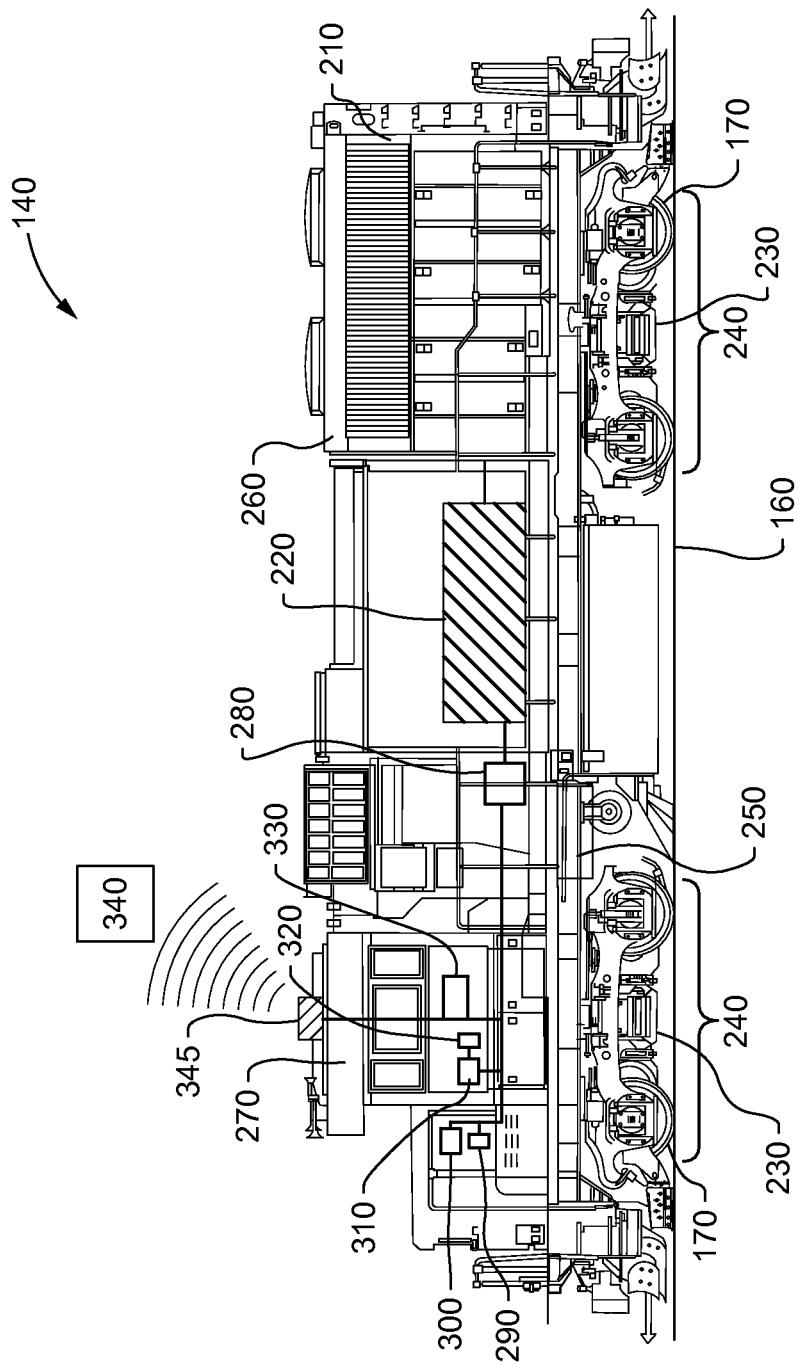
FIG. 2 is a side view of a locomotive of the train consist of FIG. 1 in accordance with one embodiment of the present disclosure.

FIG. 2 illustrates a typical locomotive 140 attached to a train 130. locomotive 140 may include an engine 210, or other power source, and a power system 220. The engine 210 may be electric, diesel, steam, hydrogen, gas turbine powered, hybrid, or of any other type for generating energy to propel the train 130. The power system 220, such as but not limited to, a generator, may be configured to distribute electrical power to propulsion and non-propulsion electric loads of the locomotive and any other attached rail vehicles.

The traction motors 230 and wheels 170 may be coupled to the locomotive 140 using a chassis or subassembly often referred to as a bogie 240 or truck. In some embodiments, the locomotive 140 may have a plurality of bogies 240 configured with a traction motor 230 and two sets of wheels 170, however, other configurations are possible. Moreover, the bogies 240 may include other components such as brakes (not shown), axles (not shown) or any other components associated with the bogies 240. The bogies 240 may be attached to a locomotive frame 250 and the frame 250 may be further configured to support a locomotive body 260, the engine 210, the power system 220, and any other locomotive components associated with the locomotive 140. Furthermore, the locomotive body 260 may have an operator station 270 that forms an enclosure for an operator and other personnel. Moreover, in some embodiments the operator station 270 may contain a set of controls (not shown) and other instrumentation (not shown) to operate the locomotive 140 and the train 130.

Further connected to the engine 210 and power system 220, a controller 280 may be present within the locomotive body 260. The controller 280 may be any type of electronic processor such as, but not limited to, a dedicated processor operable to send and receive electronic information, commands, and signals. If connected to the engine 260, the controller 280 may be able to send and receive electronic information relating to the operational health and efficiency of the engine 210. In the same regard, the controller 280 may be connected to the power system 220 to send and receive electronic information relating to the operational performance and state of the power system 220. Furthermore, the controller 280 may attach to a locomotive subsystem 290, such as but not limiting to a drive system or a braking system of the locomotive 140, or a train subsystem 300, such as but not limited to the electronic braking control (EBC) system of the train 130. Additionally the controller 280 may be connected to a device output such as a user interface 310 having a display screen 320 located within the operator station 270 of the locomotive 140. The display screen 320 may display the outputted information related to the train 130 and its internal components for the operator to observe and adjust the functionality of the train 130 based on the outputted information.

Furthermore, the controller 280 may additionally connect to the signaling system 330 of the locomotive 140 to communicate wirelessly with a signaling system back office 340 and other devices. The signaling system back office 340 communicates with the signaling system 330 of the locomotive 140 through a wireless Wi-Fi, or cellular, or satellite modem 345 located on the locomotive body 260 and connects to each the signaling system 330 and the controller 280 of the locomotive 140. Information from the signaling system back office 340 is transmitted through the wireless connection to the signaling system 330 regarding updated track clearances, updated track congestion, and updated authorized speed information. Additionally, the signaling system 330 may communicate information regarding the overall health and functionality of the locomotive 140 and the train 130 to the signaling system back office 340. Based on health and operational information received by the signaling system back office 340, the signaling system back office 340 may then communication commands to either the locomotive 140 or the operator of the locomotive 140 to adjust operation of the train 130 so that issues impairing proper train operation may be addressed.

In an exemplary embodiment of the present disclosure, track clearance may be granted by the signaling system back office 340. This information is relayed to the signaling system 330 of the locomotive 140 and in turn to the operator through the user interface 310 located within the operator station 270. The operator or signaling system back office 340 depending on the configuration of the locomotive 140 may then input a command to move the train 130 to a desired location based on the track clearance information received. As the train 130 begins to move and change location, information may be sent continuously between the signaling system back office 340 and the signaling system 330 of the locomotive 140 relating to these adjustments.

In another operational scenario, the signaling system 330 can transmit information regarding the health of the locomotive 140, any one of the locomotives 140, 190, or 200 of the consist 180, or any of the railcars 150 to the signaling system back office 340. If, for example, a mechanical failure occurs in the locomotive 140, a warning signal would be transmitted from the controller 280 through the signaling system 330 to the signaling system back office 340. After a user in the signaling system back office 340 evaluates the severity of the malfunctioning locomotive 140, the signaling system back office 340 may send operational commands back to the signaling system 330 of the locomotive 140. If a power down procedure or a reduced speed operation is needed, the user in the signaling system back office 340 will input a command to power down the locomotive 140 if no operator is present, or communicate to the operator of the locomotive 140 authorization to initialize a power down sequence. This power down procedure will effectively stop the train 130 until the problem with the malfunctioning locomotive 140 can be resolved by maintenance personal, the operator, or a user located within the signaling system back office 340.

Figure 3:
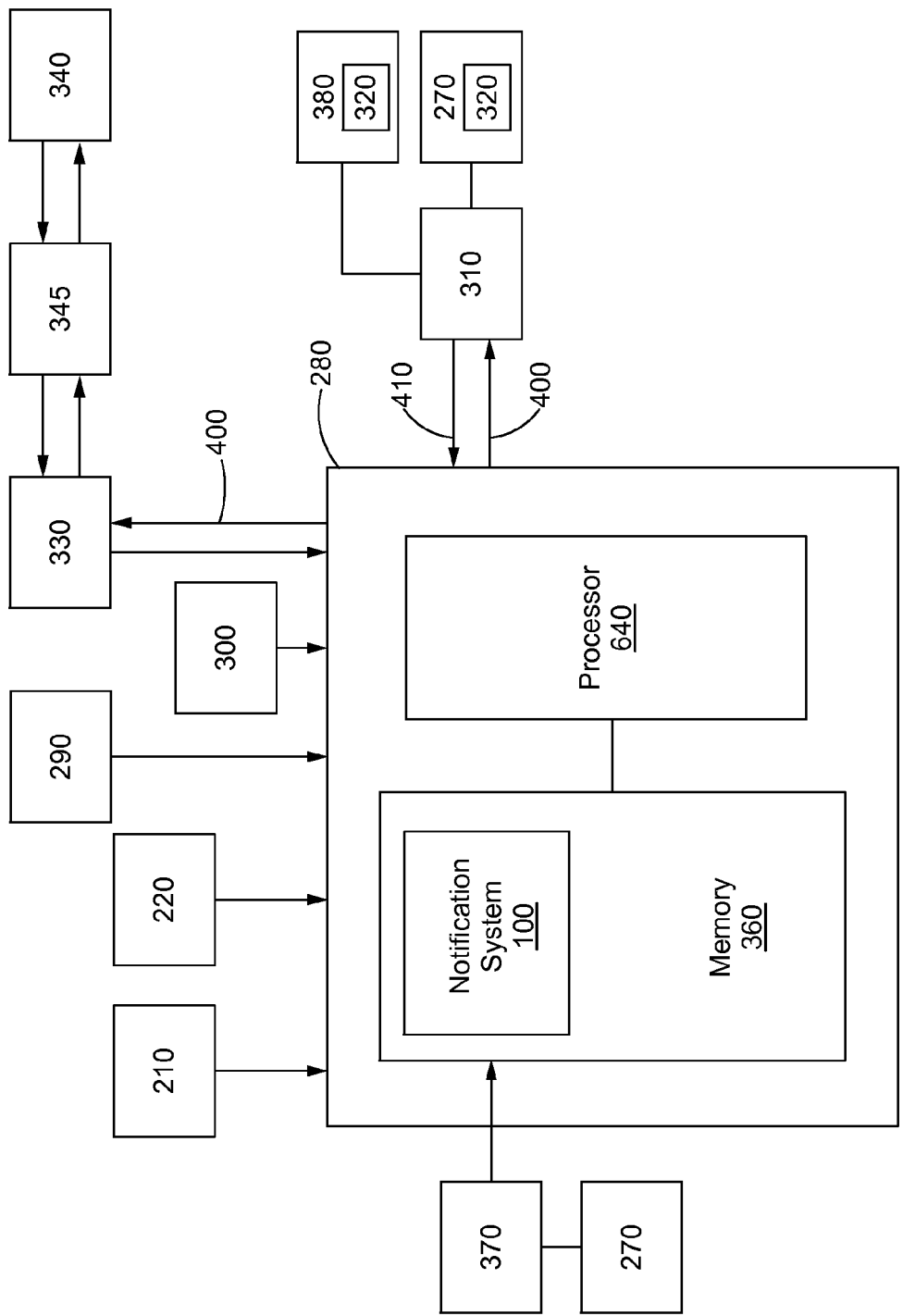
FIG. 3 is a block diagram of a controller having a notification system contained within the locomotive in accordance with an embodiment of the present disclosure.

Turning now to FIG. 3, the controller 280 of the locomotive 140 is viewed. The controller 280 may contain a processor 350 as stated above. The processor 350 of the controller 280 can be any of a microprocessor, microcomputer, application-specific integrated circuit, or the like. For example, the processor 350 can be implemented by one or more microprocessors or controllers within an integrated circuit design. The processor 350 may be used to execute specified programs stored within a memory 360 of the controller 280 to control and monitor the various functions associated with the train 130.

Similarly, a memory 360 or non-transitory storage medium may reside on the same integrated circuit as the processor 350 within the controller 280. The memory 360 may include a random access memory (i.e., Synchronous Dynamic Random Access Memory (SDRAM), Dynamic Random Access Memory (DRAM), RAMBUS Dynamic Random Access Memory (RDRAM) or any other type of random access memory device or system). Additionally or alternatively, the memory 650 or non-transitory storage medium may include a read only memory (i.e., a hard drive, flash memory, EPROM, or any other desired type of memory device).

The information that is stored by the memory 360 can include program modules associated with one or more systems of the train 130 as well as informational data relating to the train 130. The program modules are typically implemented via executable instructions stored in memory 360 to control basic functions of the controller 280 and its interaction with the systems of the train 130 and other outside devices. These functions may include interaction among various system components of the train 130 and storage, retrieval, and processing of system component data to and from the memory 360.

With respect to the program modules stored within the memory 360, these utilize the processor 350 to provide a more specific functionality of the system information received by the controller 280. In an embodiment of the present disclosure, the notification system 100 may be located within the memory 360 of the controller 280. This notification system 100 may be loaded into the memory 360 of the controller 280 through a device input 370 of the controller 280. The device input 370 of the controller 280 may connect to the operator station 270 of the train 130 or be accessible by maintenance personal performing work on the controller 280.

The notification system 100 operates through the processor 350 of the controller 280 and communicates with various inputs and outputs connected to the notification system 100 through the controller 280. The notification system 100 may receive input information from each the engine 210, the power source 220, locomotive subsystems 290, train subsystems 300, and the signaling system 330 of the locomotive 140. Information sent from these components may be related to the operation health and functionality of the multiple systems contained within the train 130 or the locomotive 140. From the signaling system 330, the notification system 100 may receive information from the signaling system back office 340 regarding train position, operational command, or journey information through use of the wireless (Wi-Fi), or cellular, or satellite modem 345. The notification system 100 may also operate to output information in the form of output signals to various attached devices or communication platforms to the notification system 100. The notification system 100 may report to the signaling system back office 340 through the wireless Wi-Fi, or cellular, or satellite modem 345 of the locomotive 140. This output information may pertain to informational data regarding geographical position, operational commands issued, status of locomotive of consist systems, train asset status notifications, or other journey information of the train 130 or locomotive 140. Additionally, the notification system 100 may output information to a connected user interface 310 for an individual. In some scenarios, the user interface 310 may be a display screen 320 within the operator station 270 of the locomotive 140 with the user being the operator of the train 130. However, in other operational scenarios, the user interface 310 may be a personal electronic device 380, such as but not limited to a smartphone or a computer, of an operator, technician, crew member, or back office employee. The outputted information to the user interface 310 may be similar or the same as the information communicated to the signaling system back office 340 by the notification system 100.

The notification system 100 may be a priority based system which can send information to various personnel involved in train asset management to inform them of the status of the train 130 or the locomotive 140. This may include sending out train asset status notifications 400 from the notification system 100 to the appropriate personal. These train asset status notifications 400 may include any type of information relating to a train 130 or train asset. In an exemplary embodiment of the present disclosure, the train asset status notifications 400 may update a user or train operator regarding the operation status of the train 130 or train asset, the status of the engine 210 or the power system 220 of the locomotive 140, the status of a locomotive subsystem 290 or the train subsystem 300 of a train asset, whether a malfunction has occurred within the train 130 or a system or subsystem of the train asset, the current operating parameter values associated with a system/subsystem/component of the train 130 or train asset, the location of the train asset, whether maintenance is required on the train 130, train subsystem, or train asset, and any other pertinent information relating to the proper operation and functionality of the train 130, subsystems of the train, or train assets. Additionally, personal may access the notification system 100 through the user interface 310 to update or load a set of train asset status notification preferences 410 regarding which train asset status notifications 400 the user would like to have access to and which train asset status notifications 400 the user wishes to ignore or silence.

The notification system 100 may deliver the train asset status notifications 400 to appropriate personnel in any of the plurality of ways stated above. In an exemplary embodiment of this delivery, the train asset status notifications 400 may be sent to a user connected to the notification system 100 by way of a personal device 380 having a user interface 310 and a display screen 320. The display screen 320 may provide a virtual representation of the train 130 and or train assets reported by the notification system 100. This virtual representation may provide textual labels, numeric values, shading, color coding, or other visual representations of train 130 or train asset information in order to convey information to a user or personnel. In certain scenarios, a user may be provided with an updatable list of train asset status notifications 400 relating to all train asset status notifications 400 sent out by the notification system 100. In other exemplary scenarios, the train asset status notifications 400 may be provided in the form of emails or text messages or any other type of alert that may be retrieved by a user on a personal device or a computer.

As stated above, many different users may be connected to the notification system 100 to receive train asset status information 400 relating to the locomotive 140 or train 130. However, different users, such as but not limited to, operators of the train, technicians, relief crews, and back office personal may prioritize certain train assets over others. Therefore, the notification system 100 may be operated in such a way that only applicable train asset status notifications 400 and information are transmitted and received by the authorized personal. The train asset status notifications 400 may be prioritized in a list of displayed notifications. This list may be different for the various users involved in train asset management. Additionally, the notification system 100 may remove little-used or over-occurring notifications to certain personal which may not be concerned with such information. Furthermore, the notification system 100 may prevent train asset status notifications 400 from being transmitted to all or certain personal in some situation. Overall, the notification system 100 is adaptable to the needs of the various personnel communicating with the notification system.

Figure 4:
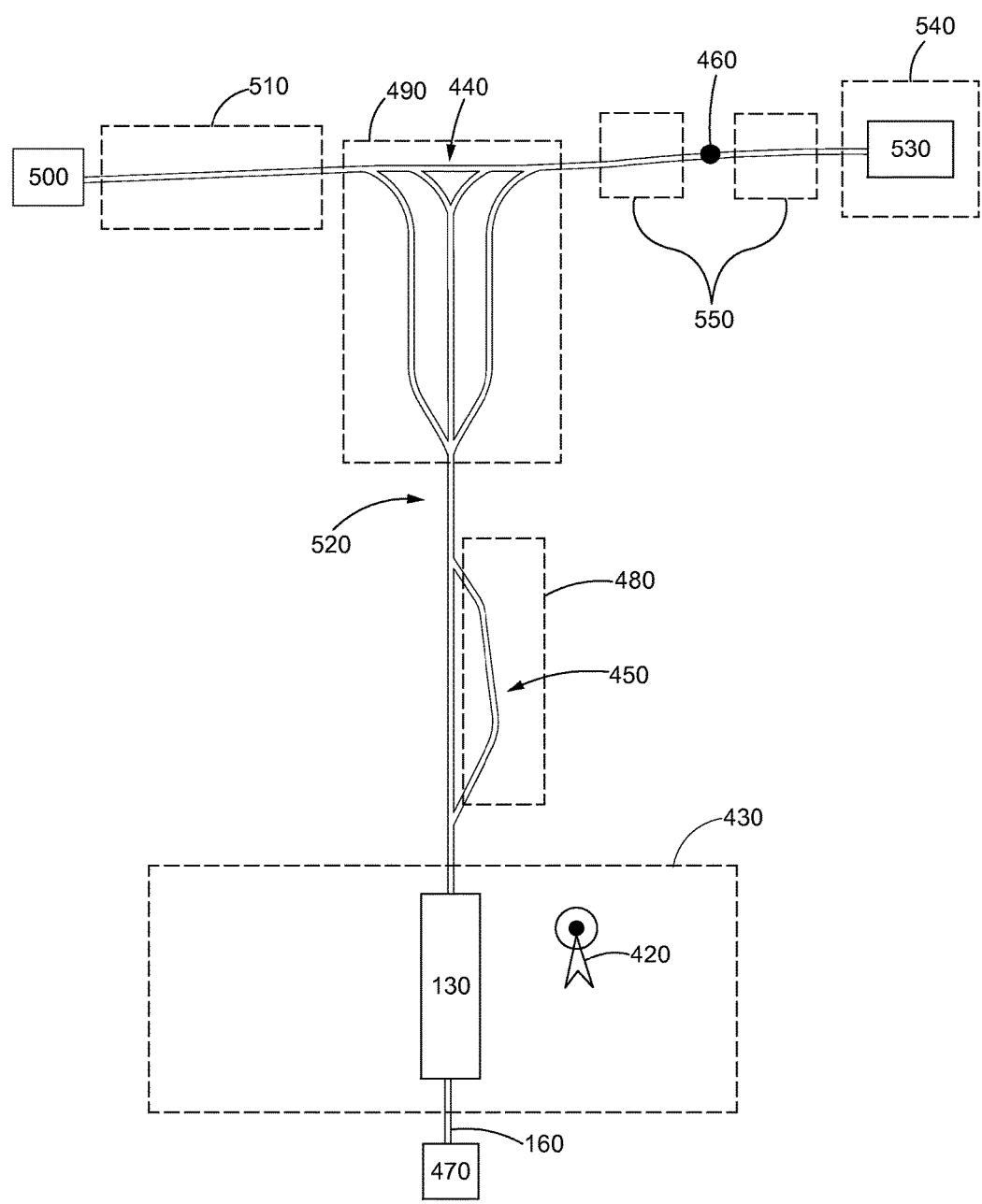
FIG. 4 is schematic view of a train moving through a geo-fenced location while traveling a route in accordance with an embodiment of the present disclosure.

FIG. 4, as depicted, shows a train 130 moving across a geographical region 410 having multiple geo-fences 430. The geo-fence 430 is a bounded geographical area determined by a series of geographical coordinates obtained a global positioning system. The boundaries of a geo-fence 430 are not concrete and can be updated according to the wishes and desires of the train personal utilizing these geo-fences for information. As the train travels along the track 160, the signaling system 330 of the locomotive 140 may communicate with a radio tower 420 in close proximity to the train 130. The radio tower 420 may aid in the transmission of information from the notification system 100 to the signaling system back office 340 and provide aided communication back to the locomotive 140 from the signaling system back office 340. Additionally, though Wi-Fi capabilities of the wireless (Wi-Fi), cellular, or satellite modem 345 or hardwired connections to the user interface 310 within the operator station 270 of the locomotive 140, the notification system 100 may transmit information to personal located within an immediate proximity of the train 130 while the train 130 travels. The signaling system 330 of the locomotive 140 is also in communication with a plurality of global positioning system (GPS) satellites in orbit around the earth. The plurality of GPS satellites communicate with the signaling system 330 of the locomotive 140 to provide a geographical coordinate position of the train 130. The geographical coordinate position of the train 130 can then be transmitted by the notification system 100 to the various personal connected to the notification system 100. The geographical coordinate position may, in some embodiments, be used to identify and prioritize the train asset status notifications 400 sent by the notification system 100 to various personal.

Also seen on FIG. 4, are multiple geographical areas enclosed by a geo-fence 430. The geo-fences 430 may be associated with a multitude of different types of geographical locations into which a train may travel. For example, geo-fences 430 may be placed at a predetermined distance from a rail yard 440, containing a siding 450 including parallel track to temporarily hold a train, at a crew change point 460, or at any other location of interest to train personal and the notification system 100.

The train, in FIG. 4, is viewed traveling from a departure point 470 to the railyard 440. The train 130 is located within a first geo-fence 430 along the tracks 160 it will follow to the railyard 440. A siding area 450 may be located off to one side of the track 160 which may have a siding geo-fence 480 containing the siding area. The notification system 100 may utilize the information that the train 130 is located within a first geo-fence 430. This may include reporting a first set of train asset status notifications than if the train 130 was located, for example traveling from the departure point 470 to the railyard 440. As the train 130 enters the railyard 440, the train 130 may enter a second geo-fence 490. This second geo-fence 490 may be used by the notification system 100 to adjust the train asset status notifications 400 to report a second set of train asset status notifications. Accordingly as the train 130 is no longer located within the first geo-fence 430, the first set of train asset status notifications is not reported by the notification system 100. Then, if the train 130 continues along its journey to a destination 500, the train 130 may enter a third geo-fence 510. The third geo-fence 510, like the first and the second geo-fence 430 and 490, allow the notification system 100 to determine that the train 130 is within the predetermined area between the destination 500 and the railyard 440 and is traveling between these points. Accordingly, the notification system 100 may adjust the train asset status notifications 400 to transmit a third set of train asset status notifications to the various personal based on its location within the third geo-fence 510. During the travel of the train 130 from the departure point 470 to the destination 500, the train 130 may pass through areas were no geo-fence is present. These non-fenced areas 520 may have additional sets of train asset status notifications transmitted from them when the train is traveling through the non-fenced area 520. In some non-fenced areas 520, the notification system 100 may report all train asset status notifications 400 to all users ensuring a consent supply of information from the train 130. In other more remote non-fenced areas 520, the notification system 100 may operate to cease communication of all train asset status notifications 400 as the geographical conditions or train travel itinerary may state that it would be difficult or not necessary to receive continuous train updates through such areas.

The notification system may use the geo-fenced areas 430, 480, 490, and 510 of FIG. 4 to adjust its functionality. As stated above, the notification system 100 is used to send train asset status notifications 400 to various personnel involved in train asset management. These train asset status notifications 400 may provide valuable information, but they also have the potential to overwhelm the users with information. This can lead to frustration and even inefficiencies in assimilating information contained within the train asset status notifications 400 and/or in acting on the issues identified within the train asset status notifications 400. Therefore, to limit these potential faults, the notification system 100 may employ the help of geo-fences 430, 480, 490, and 510 to intelligently limit and or deliver train asset status notifications 400 to the correct personnel.

Additionally, the geo-fences 430, 480, 490, or 510 may be used to either cancel or silence train asset status notifications 400 sent from the notification system 100. In some conditions, a geo-fence may 430, 480, 490, or 510 provide the notification system 100 with a geographical marker to cancel or turn off a particular train asset status notification 400 so that it no longer exists in the active notification system. In other scenarios, the geo-fence 430, 480, 490, or 510 may be used to silence train asset status notifications 400 such that they become temporarily invisible to certain users, but still exist and remain accessible within the notification system 100.

When a train enters a particular geo-fence (the first geo-fence 430, the siding geo-fence 480, the second geo-fence 490 or the third geo-fence 510) of FIG. 4, the notification system 100 may determine which train asset status notifications 400 to provide to personal (e.g. back office operator, operator of the train, technician, or relief crew). The notification system 100 may intelligently limit the train asset status notifications 400 in two different ways. In one aspect of the present disclosure, the notification system 100 may determine a train asset status notification 400 to be presented to a user. The determined train asset status notification 400 however may then be omitting from being transferred to the user and future train asset status notifications 400 relating to the original determined train asset status notification 400 may be forgone in reporting to the user based on the determined location of the train 130 within a specific location (e.g. a geo-fence 430, 480, 490, or 510). In another aspect of the present disclosure, the notification system 100 may generate a new set of train asset status notifications 400 based specifically on a determined geographical location and geo-fence rules.

When the train 130 is in operation it will travel along the tracks 160 from the departure point 470 to the destination 500. During this travel the train may pass through multiple geo-fences 430, 480, 490, or 510 operable to report different notifications based on the notification system 100. Each geo-fence 430, 480, 490, or 510 may allow a certain predetermined amount of train asset status notifications 400 to be displayed or omitted depending on the parameters of the geo-fence set within the notification system 100. For example, certain train asset status notifications 400 may be suspended upon determining that the train 130 or train asset is located within a certain geo-fence 430, 480, 490, or 510.

When the train 130 or train asset enters a predetermined geo-fenced area 430, 480, 490, or 510, messages or train asset status notifications 400 that would have otherwise been provided to the user may be suspended based on the rules of the entered geo-fence 430, 480, 490, or 510 stored within the notification system 100. In an exemplary scenario of the forgoing, a train 130 may enter a railyard 440. The railyard 440 may be contained within a geo-fence (the second geo-fence 490 of FIG. 4) stored within the notification system 100. Within the railyard 440 and the corresponding geo-fence 490, train asset status notifications 400 relating to low fuel may be suspended, as they are not pertinent to the user as the train 130 is already in the railyard 440 and not traveling along the tracks 160. In another exemplary situation, the train 130 may enter a maintenance/repair facility 530. Like the railyard 440, the maintenance/repair facility 530 may be enclosed by an accompanied maintenance geo-fence 540. While the train is within the maintenance/repair facility 530, new train asset status notifications 400 regarding the operation of certain systems being tested or worked on during maintenance or repairs may be suspended.

Additionally, the notification system 100 may output a different set of train asset status notifications 400 to different users based on a particular geo-fence 430, 480, 490, 510, or 540. When the train 130 enters the geo-fence 430, 480, 490, 510, or 540, the notification system 100 may send a first set of train asset status notifications to a first user. This first set of train asset status notifications may be based on the set of train asset status notification preferences stored within the notification system 100 regarding the first user. Furthermore, the first set of train asset status notifications may be based on the job description of the first user (e.g. operator of the train, technician, and back-office operator) or the security clearance of the first user in relationship to the information sent from the notification system 100.

The same relationship may be true for a second set of train asset status notifications sent to a second user when the train 130 enters the particular geo-fence 430, 480, 490, 510, or 540. This second set of train asset status notifications may be based on the set of train asset status notification preferences stored within the notification system 100 regarding the second user. Moreover, the second set of train asset status notifications may be based on the job description of the second user (e.g. operator of the train, technician, and back-office operator) or the security clearance of the second user in relationship to the information sent from the notification system 100.

In other scenarios, the notification system 100 may generate train asset status notifications 400 based on the location of the train 130 entering or leaving an established geo-fence 430, 480, 490, 510, or 540. In an exemplary embodiment of this scenario, the notification system 100 may send an automatically generated train asset status notification 400 or alert to appropriate users when the train enters or crosses a particular geo-fence 430, 480, 490, 510, or 540. In some scenarios, where a crew change geo-fence 550 may be established at a certain predetermined distance from a crew change point 460, train asset status notifications 400 may be generated and sent by the notification system to the new crew, relief crew, and/or train operators when the train 130 designated for a crew change crosses and enters the crew change geo-fence 550. This type of train asset status notification 400 may indicate the distance the incoming train 130 is from the crew change point as well as the estimated time from arriving at the crew change point 460. Additionally, the notification system 100 may produce train asset status notifications 400 based on a siding geo-fence 480 around a siding area 450 of track. When a train 130 enters the siding area 450, a train asset status notification 400 may be generated and sent to appropriate personal indicating that the train 130 has entered a siding area 450. Additional train asset status notifications 400 may then be generated and sent regarding the amount of time the train 130 remains within the siding area 450. When the train 130 enters the siding area 450, a timer may begin to run and the notification system 100 may send a train asset status notification 400 to the appropriate personal regarding the time elapsed since entering the siding area 450. Upon leaving the siding area 450, the timer may be stopped, and another train asset status notification 400 may be sent from the notification system 100 to the appropriate personal indicating that the train 130 has left the siding area 450, and including the total amount of time the train 130 remained within the siding area 450.

INDUSTRIAL APPLICABILITY

From the foregoing, it may be appreciated that the notification system disclosed herein may have applicability in a variety of industries such as, but not limited to, use in the rail transport industry. Use of the disclose notification system would allow multiple users concerned with train asset management a consent stream of detailed information relating to the pertinent aspects of train management there job title and focus entails. Such a notification system, would allow for seamless transmission of relevant train information to multiple users while protecting those users from over inundation of non-applicable information regarding certain train operations. Furthermore, users of the notification system can set and allow access to specific train asset status notifications while forgoing other notifications depending on the wishes of the user, or the specific geo-fence configuration.

Moreover, the disclosed notification system can be employed in any type of industry that facilitates transportation along a known route. Such industries may include mining, construction, farming, marine based shipping, on-highway transportation, rail transportation, air transportation, or any like industry in which known routes of travel may be geo-fenced to provide important notifications back to the users of the notification system.

Figure 5:
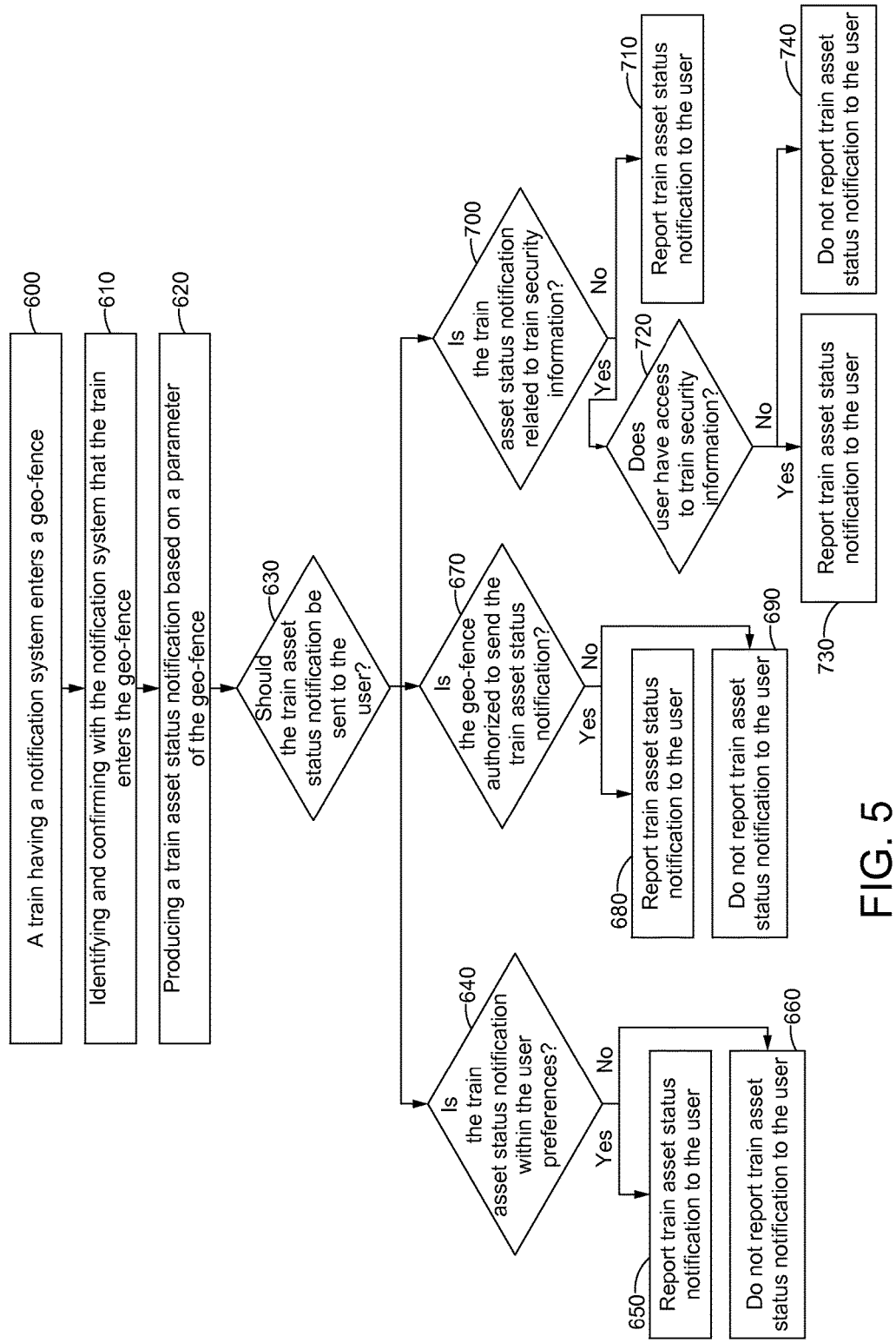
FIG. 5 is a flow chart showing a method of reporting a train asset status notification to a user in accordance with an embodiment of the present disclosure.

An exemplary method to determine whether a train asset status notification 400 should be sent to a user according to the present disclosure is shown in flow chart format within FIG. 5. As shown in a block 600, a train 130 with a notification system 100 enters a geo-fence 430. The train 130 may encounter many geo-fences 430, 480, 490, 510, 540 or 550 along its journey from its departure point 470 to its destination 500. Then in block 610, the geo-fence 430 is identified and confirmed by the notification system 100. Next, in block 620, the notification system 100 produces a train asset status notification 400 according to the parameters set by the geo-fence 430. Each individual geo-fence 430, 480, 490, 510, 540 or 550 may have different parameters set and saved within the notification system 100 as to what information may be transmitted when the train 130 enters a particular geo-fence 430, 480, 490, 510, 540 or 550. Then in block 630, the notification system 100 may determine if the train asset status notification 400 should be sent to the user.

In determining whether or not a train asset status notification 400 should be sent to a user, the notification system 100 may solve three pertinent scenarios. The first scenario, as seen in block 640, allows the notification system 100 to determine if the train asset status notification 400 is within a set of train asset status notification preferences determined by the user. If the train asset status notification 400 is within a set of train asset status notification preferences determined by the user, the notification system reports the train asset status notification to the user in block 650. However, if the train asset status notification 400 is not within a set of train asset status notification preferences determined by the user, the train asset status notification 400, in block 660, is not reported and removed from list of train asset status notifications 400 which could be reported to the user.

In block 670, the notification system 100 addresses the second scenario where it determines whether or not the train asset status notification 400 is authorized to be sent by the geo-fence 430. If the train asset status notification 400 is authorized to be sent by the geo-fence 430, the train asset status notification 400 is reported to the user by the notification system 100 in block 680. However, if train asset status notification 400 is not authorized to be sent by the geo-fence 430, the train asset status notification, in block 690, is not reported and removed from list of train asset status notifications 400 which could be reported to the user. This may occur when a particular geo-fence 430, 480, 490, 510, 540 or 550 has a security setting implemented within it to prohibit the sending of train asset status notifications 400 or if the particular geo-fence 430, 480, 490, 510, 540 or 550 is located within a specific area where not each and every train asset status notification 400 is relevant to the operation of the train.

Finally, in the third scenario of block 700, the notification system 100 determines if the train asset status notification 400 relates to train security information. If the train asset status notification 400 does not relate to train security information, the train asset status notification 400 is sent to the user in block 710. If, however, the train asset status notification 400 relates to train security information, the notification system 100 must determine, in block 720, if the user is authorized to receive the train security information. A user, being authorized to receive train security information, would then receive the reported train asset status information 400 from the notification system 100 in block 730. If, however, the user is not authorized to receive train security information, the train asset status notification 400, in block 740, is not reported and removed from list of train asset status notifications 400 which could be reported to the user.

While the foregoing detailed description addresses only specific embodiments, it is to be understood that the scope of the disclosure is not intended to be limited thereby. Rather, the breadth and spirit of this disclosure is intended to be broader than any of the embodiments specifically disclosed.

What is claimed is:

1. A notification system for use on a mobile machine, the notification system comprising:
   a route upon which the mobile machine may travel;
   a geo-fence enclosing at least a portion of the route through which the mobile machine may travel, wherein the geo-fence is a bounded geographical area determined by a series of geographical coordinates;
   a status notification, the status notification relating to an operational health of the mobile machine, or a subsystem of the mobile machine, the status notification being generated by the notification system when the mobile machine enters the geo-fence; and
   a user receiving the status notification from the notification system based on a job description of the user, wherein the notification system uses the geo-fence to intelligently limit the status notification sent to the user in response to determining that based on the job description of the user at least a portion of the status notification should be received by the user when the mobile machine is within the geo-fence.

2. The notification system of claim 1, wherein the mobile machine is a train, and the status notification is at least one train asset status notification of a plurality of train asset status notifications.

3. The notification system of claim 2, wherein the user receives the at least one train asset status notification on a user interface based on the user having a train asset status notification preference for receiving the status notification, the user able to access the notification system through the user interface to input a set of train asset status notification preferences regarding which of the at least one train asset status notifications will be received by the user.

4. The notification system of claim 2, wherein the geo-fence may be a plurality of geo-fences, a first geo-fence of the plurality of geo-fences providing a first set of train asset status notifications to the user and a second geo-fence of the plurality of geo-fences providing a second set of train asset status notification to the user.

5. The notification system of claim 4, wherein the first set of train asset status notification may be sent to a first user and an alternate first set of train asset status notification may be sent to a second user, and wherein the second set of train asset status notifications may be sent to the first user and an alternate second set of train asset status notifications may be sent to the second user.

6. The notification system of claim 2, wherein the route is a track and at least a portion of the route includes either the track, a railyard, a siding including a parallel track, or a crew change point.

7. The notification system of claim 6, wherein the geo-fence may include a plurality of geo-fences, the plurality of geo-fences to enclose at least portions of the track, the railyard, the siding including the parallel track, or the crew change point.

8. The notification system of claim 2, wherein when the train enters the geo-fence, the notification system may cancel or silence at least one train asset status notification to be received by the user in response to determining that the status notification should not be received by the user when the mobile machine is within the geo-fence.

9. A train comprising:
a plurality of rail cars positioned along a track and attached to one another;
a locomotive being one of the plurality of rail cars;
an engine located within the locomotive;
a locomotive subsystem located within the locomotive;
a signaling system located on the locomotive;
a controller attached to each the engine, the locomotive subsystem, the signaling system, and a train subsystem, the controller located within the locomotive; and
a notification system contained within the controller, the notification system having a route upon which the train may travel, a geo-fence enclosing at least a portion of the route through which the train may travel, wherein the geo-fence is a bounded geographical area determined by a series of geographical coordinates, a plurality of train asset status notifications relating to either the engine, the locomotive subsystem, or the train subsystem, the plurality of train asset status notifications being generated by the notification system when the train enters the geo-fence, and a user receiving the plurality of train asset status notifications from the notification system based on a job description of the user, wherein the notification system uses the geo-fence to intelligently limit the status notification sent to the user in response to determining that based on the job description of the user at least a portion of the status notification should be received by the user when the train is within the geo-fence.

10. The train of claim 9, wherein the user receives at least one train asset status notification of the plurality of train asset status notifications on a user interface based on the user having a train asset status notification preference for receiving the status notification, the user able to access the notification system through the user interface to input a set of train asset status notification preferences regarding which of the plurality of train asset status notifications will be received by the user.

11. The train of claim 9, wherein the geo-fence may be a plurality of geo-fences, a first geo-fence of the plurality of geo-fences providing a first set of train asset status notifications to the user and a second geo-fence of the plurality of geo-fences providing a second set of train asset status notification to the user.

12. The train of claim 11, wherein the first set of train asset status notification may be sent to a first user and an alternate first set of train asset status notification may be sent to a second user, and wherein the second set of train asset status notifications may be sent to the first user and an alternate second set of train asset status notifications may be sent to the second user.

13. The train of claim 9, wherein the route is a track upon which the train travels and at least a portion of the route includes either the track, a railyard, a siding including a parallel track, or a crew change point.

14. The train of claim 13, wherein the geo-fence may include a plurality of geo-fences, the plurality of geo-fences to enclose at least a portion of the track, the railyard, the siding including the parallel track, or the crew change point.

15. The train of claim 9, wherein when the train enters the geo-fence, the notification system may cancel or silence at least one train asset status notification received by the user in response to determining that the status notification should not be received by the user when the train is within the geo-fence.

16. A method of reporting a train asset status notification to a user, the method comprising:
providing a train having a notification system;
entering a geo-fence with the train having the notification system, wherein the geo-fence is a bounded geographical area determined by a series of geographical coordinates;
identifying and confirming within the notification system that the train has entered the geo-fence;
producing the train asset status notification based on a parameter of the geo-fence stored within the notification system; and
reporting to the user the train asset status notification based on a job description of the user, wherein the notification system uses the geo-fence to intelligently limit the train asset status notification reported to the user in response to determining that based on the job description of the user at least a portion of the train asset status notification should be received by the user when the train is within the geo-fence.

17. The method of claim 16, wherein before reporting to the user the train asset status notification, the notification system determines whether the train asset status notification is stored within a set of train asset status notification preferences inputted by the user.

18. The method of claim 16, wherein before reporting to the user the train asset status notification, the notification system determines whether the train asset status notification is authorized to be reported to the user based on a set of parameters of the geo-fence stored within the notification system.

19. The method of claim 16, wherein before reporting to the user the train asset status notification, the notification system determines whether the train asset status notification applies to a set of train security information.

20. The method of claim 19, wherein determining whether the train asset status notification applies to the set of train security information further comprises determining whether the user has an authorized access to the set of train security information.

* * * * *